United States Patent
Martinez et al.

(10) Patent No.: US 10,563,009 B2
(45) Date of Patent: Feb. 18, 2020

(54) PROCESS TO PRODUCE A POLYOLEFIN REACTIVE TELECHELIC PRE-POLYMER

(71) Applicants: DOW GLOBAL TECHNOLOGIES LLC, Midland, MI (US); REGENTS OF THE UNIVERSITY OF MINNESOTA, Minneapolis, MN (US)

(72) Inventors: Henry Martinez, Minneapolis, MN (US); Marc A. Hillmyer, Minneapolis, MN (US); Megan Matta, Minneapolis, MN (US); Jeffrey C. Munro, Bellaire, TX (US); Kim L. Walton, Lake Jackson, TX (US)

(73) Assignees: Dow Global Technologies LLC, Midland, MI (US); The Regents of the University of Minnesota, Minneapolis, MN (US)

( * ) Notice: Subject to any disclaimer, the term of this patent is extended or adjusted under 35 U.S.C. 154(b) by 137 days.

(21) Appl. No.: 15/577,632

(22) PCT Filed: May 27, 2016

(86) PCT No.: PCT/US2016/034675
§ 371 (c)(1),
(2) Date: Nov. 28, 2017

(87) PCT Pub. No.: WO2016/191688
PCT Pub. Date: Dec. 1, 2016

(65) Prior Publication Data
US 2018/0134840 A1    May 17, 2018

Related U.S. Application Data

(60) Provisional application No. 62/167,850, filed on May 28, 2015.

(51) Int. Cl.
*C08G 61/08* (2006.01)
*C08J 3/24* (2006.01)
(Continued)

(52) U.S. Cl.
CPC .............. *C08G 61/08* (2013.01); *C08J 3/24* (2013.01); *C08G 2261/135* (2013.01);
(Continued)

(58) Field of Classification Search
None
See application file for complete search history.

(56) References Cited

U.S. PATENT DOCUMENTS 7,652,103 B2   1/2010   Kavanagh et al.
8,796,390 B2   8/2014   Clapper et al.
(Continued)

FOREIGN PATENT DOCUMENTS

WO   2003/070779 A1   8/2003
WO   2015/047840 A1   4/2015
WO   2016/191692 A1   12/2016

OTHER PUBLICATIONS

Martinez et al., "Ring-opening metathesis polymerization of 8-membered cyclic olefins," Polymer Chemistry, vol. 5, issue 11, pp. 3507-3532 (Year: 2014).*
(Continued)

*Primary Examiner* — Randy P Gulakowski
*Assistant Examiner* — Ha S Nguyen

(57) ABSTRACT

A process to produce a polyolefin reactive telechelic pre-polymer comprising reacting alkyl-cis-cyclooctene, and optionally cis-cyclooctene, in the presence of a multifunctional chain transfer agent possessing two or more amino groups wherein the two or more amino groups are protected by one or more protecting groups under ring opening
(Continued)

metathesis polymerization conditions to form a dicarbamate telechelic unsaturated polyolefin pre-polymer is provided.

5 Claims, 1 Drawing Sheet

(51) Int. Cl.
C08G 73/06 (2006.01)
C08G 73/02 (2006.01)

(52) U.S. Cl.
CPC .......... C08G 2261/1412 (2013.01); C08G 2261/1644 (2013.01); C08G 2261/228 (2013.01); C08G 2261/3322 (2013.01); C08G 2261/418 (2013.01); C08G 2261/724 (2013.01); C08G 2261/76 (2013.01); C08G 2261/80 (2013.01); C08J 2365/00 (2013.01)

(56) References Cited

U.S. PATENT DOCUMENTS

2003/0236377 A1 12/2003 Choi et al.
2013/0172493 A1 7/2013 Luo et al.
2016/0237203 A1 8/2016 Martinez et al.
2016/0333140 A1 11/2016 Martinez et al.

OTHER PUBLICATIONS

Morita et al., "A Ring Opening Metathesis Polymerization (ROMP) Approach to Carboxyl- and Amino-terminated Telechelic Poly(butadiene)s," Macromolecules 2000, vol. 33, Issue 17, pp. 6621-6623 (Year: 2000).*
PCT/US2016/034680, International Search Report and Written Opinion dated Oct. 5, 2016.
PCT/US2016/034680, International Preliminary Report on Patentability dated Nov. 28, 2017.
G Odian, Principles of Polymerization, Chapter 2, 2004, pp. 105-106, 4th ed., Wiley.
J. Cortes, et al, European Journal of Organic Chemistry, pp. 239-243, 2000.
J.M. Charlesworth, Journal of Macromolecular Science Part B, 2006, pp. 105-133.
K.R. Brzezinksa and T. J. Deming, Macromolecules, 2001, pp. 4348-4354.
S. Kobayashi, Journal of the American Chemical Society, 2011, pp. 5794-5797, vol. 133.
L. Pitet and M. Hillmyer, Macromolecules, 2011, pp. 2378-2381, vol. 44.
P. Liu, et al, Journal of Applied Polymer Science, 2009, pp. 2628-2637, vol. 113.
P. Liu, Journal of Applied Polymer Science, 2010, pp. 3722-3728, vol. 117.
T. Morita, et al., Macromolecules 2000, 33, pp. 6621-6623, vol. 33.
N.K. Boaen and M. A. Hillmyer, Chemical Society Review, 2005, pp. 267-275, vol. 34.
A. Nagarkar, et al., Macromolecules, 2012, pp. 4447-4453, vol. 45.
N. Hanik and A. Kilbinger, Journal of Polymer Science Part A: Polymer Chemistry, 2013, pp. 4183-4190.
PCT/US2016/034675, International Preliminary Report on Patentability dated Nov. 28, 2017.
PCT/US2016/034675, International Search Report and Written Opinion dated Sep. 9, 2016.
S. Ji, et al., Polymer, 2008, pp. 5307-5313, vol. 49.
S. Kobayashi, et al., Australian Journal of Chemistry, 2010, pp. 1201-1209, vol. 63.
Z He, et al., Biochimica et Biophysica Acta, 1995, pp. 117-127, vol. 1253.

* cited by examiner

PROCESS TO PRODUCE A POLYOLEFIN REACTIVE TELECHELIC PRE-POLYMER

FIELD OF INVENTION

The disclosure relates to a process to produce a polyolefin reactive telechelic pre-polymer.

BACKGROUND OF THE INVENTION

Polyolefins are useful materials as high molar mass polymers. The high chemical and oxidation resistance coupled with the competitive price of saturated polyolefins materials make them highly desirable to the plastics industry. It has been demonstrated that controlled inclusion of functional groups on the polyolefins can lead to remarkable property enhancements. However, despite the vast number of materials and applications derived from polyolefins, manufacture of their pre-polymer versions is an under-explored area. The required precise and controlled functionalization of polyolefins for the formation of rapidly cured elastomers and high molecular weight polymers has been challenging. Most methods for incorporation of reactive groups in polyolefins involve post-polymerization reactions, which generally have poor control over the functionalization location and quantity and leads to diminished mechanical properties. The synthesis of moldable, injectable, and otherwise processable reactive polyolefin pre-polymers that form cured and/or high molecular weight polymers would be desirable because such processes would open application space in a market currently dominated by materials such as silicone and urethane elastomers.

SUMMARY OF THE INVENTION

In one embodiment, the disclosure provides a process to produce a polyolefin reactive telechelic pre-polymer comprising contacting, under ring opening metathesis polymerization conditions, alkyl-cis-cyclooctene and optionally cis-cyclooctene, in the presence of a multifunctional chain transfer agent possessing two or more amino groups wherein the two or more amino groups are protected by one or more protecting groups to form a dicarbamate telechelic unsaturated polyolefin pre-polymer.

DETAILED DESCRIPTION OF THE INVENTION

Figure 1:
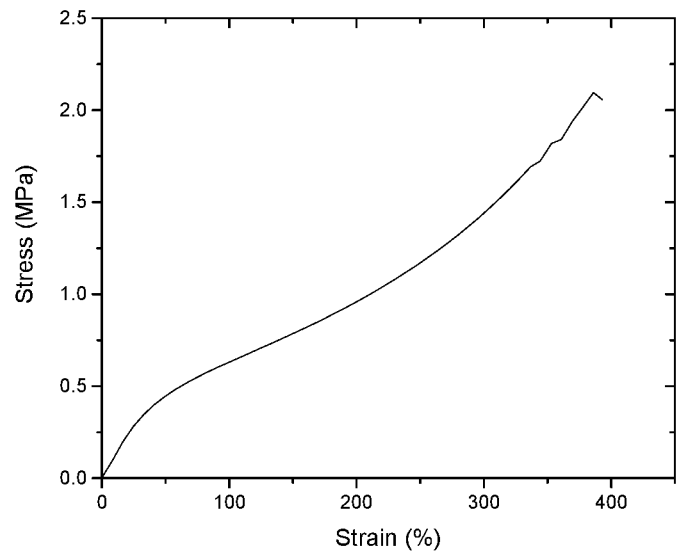
FIG. 1 is a graph illustrating the stress strain curve of crosslinked polymer, XT-A-PH(3ECOE)-2, measured at 127 mm min$^{-1}$ according to ASTM D1708.

In the inventive process to produce a polyolefin reactive telechelic pre-polymer, an alkyl-cis-cyclooctene and/or aryl-cis-cyclooctene is used. Alkyl-cis-cyclooctenes useful in embodiments of the invention are known in the art. Exemplary alkyl-cis-cyclooctenes include 3-substituted-cis-cyclooctenes, such 3-methyl-cis-cyclooctene, 3-ethyl-cis-cyclooctene, and 3-hexyl-cis-cyclooctene, Exemplary aryl-cis-cyclooctenese include 3-phenyl-cis-cyclooctenes.

The alkyl-cis-cyclooctene and optionally cis-cyclooctene, are contacted in the presence of a multifunctional chain transfer agent possessing two or more amino groups wherein the two or more amino groups are protected by one or more protecting groups. Exemplary protecting groups include the following categories of compounds: carbamates (aminoesters), amides (amino-ketone), benzyl-amines, and sulfonates. Exemplary specific protecting groups useful in the invention include t-butyl carbamate ("BOC amine"); 9-fluorenylmethyl carbamate ("FMOC amine"); benzyl carbamate; trifluoroacetamide; phthalimide; benzylamine; and p-toluenesulfonamide ("tosylamide"). Exemplary protected chain transfer agents include di-tert-butyl but-2-ene-1,4-diyl (E)-dicarbamate; N,N'-(but-2-ene-1,4-diyl)bis(2,2,2-trifluoroacetamide); and 2,2'-(but-2-ene-1,4-diyl)bis(isoindoline-1,3-dione).

The contacting occurs under ring opening metathesis polymerization (ROMP) conditions, which are well known in the art and are described for example in "Regio- and Stereoselective Ring-Opening Metathesis Polymerization of 3-Substituted Cyclooctenes," Shingo Kobayashi et al, J. Am. Chem. Soc. 2011, 133, 5794-5797 and "Carboxy-Telechelic Polyolefins by ROMP Using Maleic Acid as a Chain Transfer Agent," Pitet and Hillmyer, Macromolecules 2011, 44, 2378-2381. A wide variety of catalysts are known to be useful in ROMP, including simple metal based compounds, such as a RuCl$_3$/alcohol mixture and more complex Grubbs' catalysts, which includes first and second generation Grubbs' catalysts and Hoveyda-Grubbs catalysts. First generation Grubbs' catalysts is a transition metal carbene complex having the general formula:

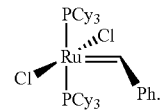

Second generation Grubbs' catalyst have the general formula:

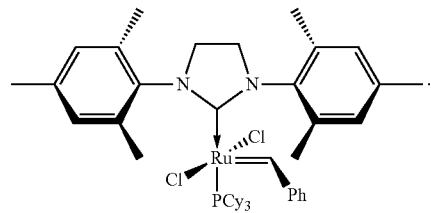

Hoyveda-Grubbs catalysts have the general formula:

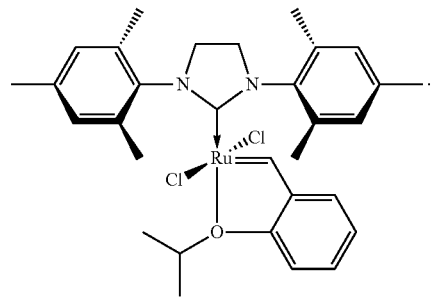

A skilled artisan would understand that any catalyst suitable for ROMP may be used. The invention is not limited by the foregoing catalyst structures nor by the use of Ruthenium as the metal for such catalysts.

Following the contacting of the alkyl-cis-cyclooctene and optionally cis-cyclooctene, in the presence of a multifunctional chain transfer agent possessing two or more protected amino groups under ring opening metathesis polymerization conditions, a dicarbamate telechelic unsaturated polyolefin pre-polymer is formed. The molecular weight and identity of the resulting pre-polymer is dependent upon the alkyl functionality of the alkyl-cis-cyclooctene.

The present disclosure further discloses the process described herein further comprising partially hydrogenating the dicarbamate telechelic unsaturated polyolefin pre-polymer to produce a saturated polyolefin dicarbamate telechelic pre-polymer. In a particular embodiment, the partial hydrogenation is accomplished by refluxing the dicarbamate telechelic unsaturated polyolefin pre-polymer in the presence of p-toluenesulfonyl hydrazide. The reaction scheme below generally depicts the formation of a diamino telechelic saturated polyolefin pre-polymer:

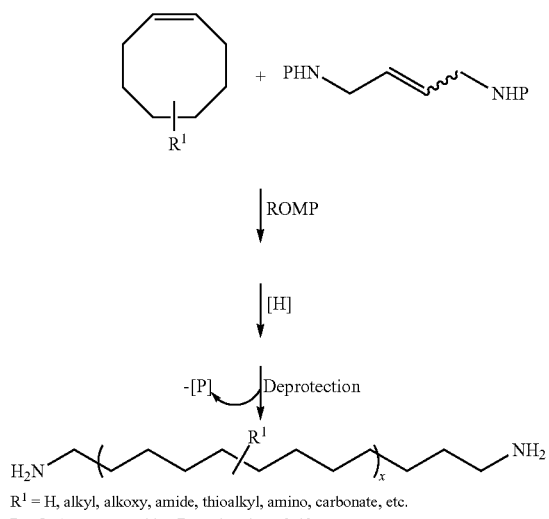

$R^1$ = H, alkyl, alkoxy, amide, thioalkyl, amino, carbonate, etc.
P = Carbamates, Amides, Benzyl-amines, Sulfonates, etc.

In a particular embodiment, the hydrogenation provides a saturation of at least 90% and results in a saturated polyolefin dicarbamate telechelic pre-polymer having at least 1.7 functionalities per pre-polymer chain. All individual values and subranges from a lower limit of 1.7 functionalities per pre-polymer chain are included herein and disclosed herein. For example, the functionalities can be from a lower limit of 1.7, 1.8, 1.9, or 2.0 functionalities per pre-polymer chain. In an alternative embodiment, the a hydrogenated polyolefin reactive telechelic pre-polymer equal to or less than 10 functionalities per pre-polymer chain, or in the alternative, from equal to or less than 7 functionalities per pre-polymer chain, or in the alternative, from equal to or less than 4 functionalities per pre-polymer chain.

In an alternative embodiment, the instant invention provides a process to produce a saturated polyolefin dicarbamate telechelic pre-polymer, in accordance with any embodiment disclosed herein, except that at least 60% of the functionalities remain following hydrogenation. All individual values and subranges from at least 60% are included herein and disclosed herein. For example, the percentage of functionalities remaining after hydrogenation can range from a lower limit of 60, 70, 80, 90 or 95.

In an alternative embodiment, the instant invention provides a process to produce a saturated polyolefin dicarbamate telechelic pre-polymer, in accordance with any embodiment disclosed herein, except that the hydrogenating results in at least 90% of the unsaturations present in the pre-polymer being hydrogenated. All individual values and subranges from at least 90% are included herein and disclosed herein; for example, the hydrogenation level can be from a lower limit of 90, 92.5, 95, or 97%.

The present disclosure further provides the process disclosed herein further comprising removing the one or more protecting groups from the saturated dicarbamate telechelic polyolefin pre-polymer to produce a saturated polyolefin diamino telechelic pre-polymer. Any appropriate method for reacting with and removing the protecting groups (e.g., contacting with an acid) may be used. In a particular embodiment, the protecting groups are removed by contacting the saturated dicarbamate telechelic polyolefin pre-polymer with trifluoro acetic acid at room temperature. In an alternative embodiment, the protecting groups are removed by contacting the saturated dicarbamate telechelic polyolefin pre-polymer with an acid such that the pH<1, at 100° C. in a pyridine or trimethylamine solvents for several minutes to several hours of reaction time.

In yet another embodiment, the present disclosure provides a dicarbamate telechelic polyolefin pre-polymer produced according to the process described herein.

In another embodiment, the disclosure provides a process for producing a crosslinked polymer comprising contacting a diamino telechelic polyolefin pre-polymer with one or more polyfunctional compounds which are reactive with the pre-polymer, optionally in the absence of a catalyst, to form a crosslinked and/or chain-extended polymer. As used herein, the term polyfunctional compound refers to a compound having more than one functional group which are reactive with the amine groups of the pre-polymer. Depending upon the functional group in the polyfunctional compound, the pre-polymer may function as a difunctional pre-polymer or a tetrafunction pre-polymer. For example, each amine group may react with two epoxy groups meaning that the pre-polymer is tetrafunctional. Exemplary polyfunctional compounds which may be used include polyfunctional epoxies, such as difunctional epoxies, polyisocyanates, polycarboxlyic acids, polyacyl chlorides and polyepoxides.

The disclosure further provides a process for producing a high molecular weight polymer comprising contacting the diamino telechelic polyolefin pre-polymer with one or more difunctional compounds which are reactive with the telechelic pre-polymer, optionally in the absence of a catalyst, to form a high molecular weight polymer. As used herein, high molecular weight polymer means a polymer having a molecular weight at least two times the molecular weight of the polyolefin reactive telechelic pre-polymer. All individual values and subranges from at least two times are included herein and disclosed herein. For example, the molecular weight of the high molecular weight polymer can be from a lower limit of two times the molecular weight of the polyolefin reactive telechelic pre-polymer, or in the alternative, the molecular weight of the high molecular weight polymer can be from a lower limit of five times the molecular weight of the polyolefin reactive telechelic pre-polymer, or in the alternative, the molecular weight of the high molecular weight polymer can be from a lower limit of ten times the molecular weight of the polyolefin reactive telechelic pre-polymer, or in the alternative, the molecular weight of the high molecular weight polymer can be from a lower limit of fifteen times the molecular weight of the polyolefin reactive telechelic pre-polymer.

In an alternative embodiment, the disclosure provides a process in accordance with any embodiment disclosed herein, except that the process further comprises simultaneously chain extending the hydrogenated polyolefin reactive telechelic pre-polymer with a mixture of a difunctional compound and thermally crosslinking the chain extended hydrogenated polyolefin reactive telechelic pre-polymer with a polyfunctional compound, both which are reactive with the telechelic pre-polymer, optionally in the absence of a catalyst, to form a chain extended, crosslinked polymer. Exemplary chain extending polyfunctional compounds include bis-isocyanates (such as 4,4'-methylenebis(phenyl isocyanate) and tolylene-2,4-diisocyanate), di-acyl chlorides (such as sebacoyl chloride), and bis-epoxies (such as 1,4-butandiol diglycidyl ether and bisphenol A diglycidyl ether). Exemplary crosslinking polyfunctional compounds include tris-epoxies (such as tris(2,3-epoxypropyl) isocyanurate and trimethylolpropane triglycidyl ether) and bis-epoxies (such as 1,4-butandiol diglycidyl ether and bisphenol A diglycidyl ether).

The chain extending reaction is generally own in the reaction scheme below:

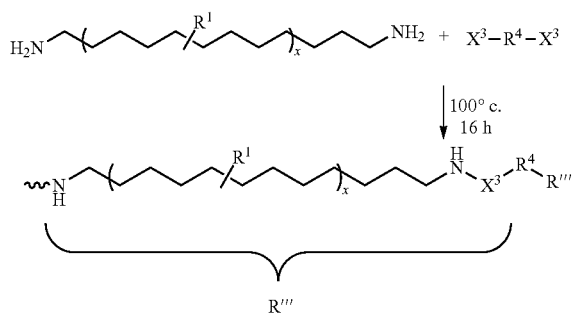

$R^1$ = H, alkyl, alkoxy, amide, thioalkyl, amino, carbonate, etc.
$R^4$ = H, alkyl, alkoxy, amide, thioalkyl, amino, carbonate, etc.
$X^3$ = epoxy, isocyante, acid chloride, alcohol, etc.

The crosslinking reaction is generally depicted in the reaction scheme below:

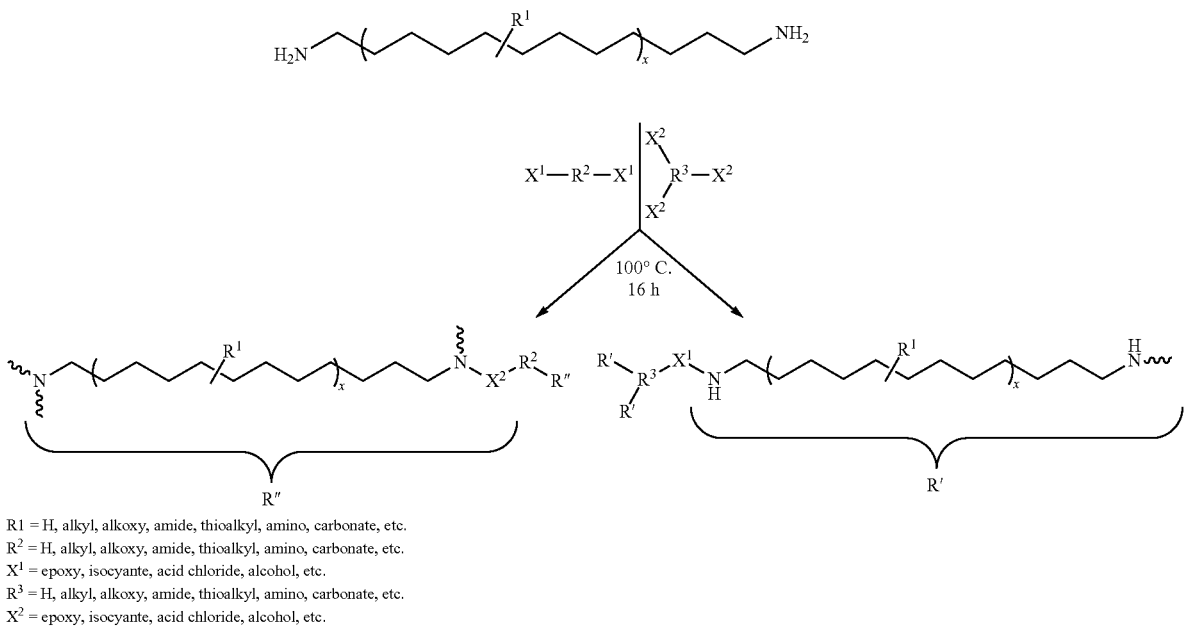

$R^1$ = H, alkyl, alkoxy, amide, thioalkyl, amino, carbonate, etc.
$R^2$ = H, alkyl, alkoxy, amide, thioalkyl, amino, carbonate, etc.
$X^1$ = epoxy, isocyante, acid chloride, alcohol, etc.
$R^3$ = H, alkyl, alkoxy, amide, thioalkyl, amino, carbonate, etc.
$X^2$ = epoxy, isocyante, acid chloride, alcohol, etc.

In yet another embodiment, the disclosure provides a crosslinked and/or chain extended polymer produced as described herein.

In an alternative embodiment, the disclosure provides a process to produce a polyolefin reactive telechelic pre-polymer, an unsaturated polyolefin reactive telechelic pre-polymer, a hydrogenated polyolefin reactive telechelic pre-polymer, a crosslinked polymer and a high molecular weight polymer, in accordance with any embodiment disclosed herein, except that the unsaturated and/or hydrogenated polyolefin reactive telechelic pre-polymer has a molar mass from 1 to 20 kg/mole. All individual values and subranges from 1 to 20 kg/mole molar mass are included herein and disclosed herein; for example, the molar mass of the unsaturated polyolefin reactive telechelic pre-polymer can be from a lower limit of 1, 3, 6, 9, 12, 15, or 18 kg/mole to an upper limit of 2, 5, 8, 11, 14, 17 or 20 kg/mole.

In an alternative embodiment, the disclosure provides a process to produce a polyolefin reactive telechelic pre-polymer, an unsaturated polyolefin reactive telechelic pre-polymer, a hydrogenated polyolefin reactive telechelic pre-polymer, a crosslinked polymer and a high molecular weight polymer, in accordance with any embodiment disclosed herein, except that the mole ratio of the functionalities on the polyfunctional compound to the functionalities of the polyolefin reactive telechelic pre-polymer is from 1:2 to 2:1. All individual values and subranges from 1:2 to 2:1 are included herein and disclosed herein; for example, the mole ratio of the functionalities on the polyfunctional compound to the functionalities of the polyolefin reactive telechelic pre-polymer can be 1:2, or in the alternative, the mole ratio of the functionalities on the polyfunctional compound to the functionalities of the polyolefin reactive telechelic pre-polymer can be 2:1, or in the alternative, the mole ratio of the functionalities on the polyfunctional compound to the functionalities of the polyolefin reactive telechelic pre-polymer can be 1.5:2, or in the alternative, the mole ratio of the functionalities on the polyfunctional compound to the functionalities of the polyolefin reactive telechelic pre-polymer can be 2:1.5, or in the alternative, the mole ratio of the functionalities on the polyfunctional compound to the functionalities of the polyolefin reactive telechelic pre-polymer can be 1:1.05, or in the alternative, the mole ratio of the functionalities on the polyfunctional compound to the functionalities of the polyolefin reactive telechelic pre-polymer can be 1:0.95. In a particular embodiment, the mole ratio of the functionalities on the polyfunctional compound to the functionalities of the polyolefin reactive telechelic pre-polymer is from 1:0.94 to 1:1.06.

In an alternative embodiment, the disclosure provides a process to produce a polyolefin reactive telechelic pre-polymer, an unsaturated polyolefin reactive telechelic pre-polymer, a hydrogenated polyolefin reactive telechelic pre-polymer, a crosslinked polymer and a high molecular weight polymer, in accordance with any embodiment disclosed herein, except that the mole ratio of the functionalities on the difunctional and polyfunctional compound to the functionalities of the polyolefin reactive telechelic pre-polymer is from 1:2 to 2:1. All individual values and subranges from 1:2 to 2:1 are included herein and disclosed herein; for example, the mole ratio of the functionalities on the difunctional and polyfunctional compound to the functionalities of the polyolefin reactive telechelic pre-polymer can be 1:2, or in the alternative, the mole ratio of the functionalities on the difunctional and polyfunctional compound to the functionalities of the polyolefin reactive telechelic pre-polymer can be 2:1, or in the alternative, the mole ratio of the functionalities on the difunctional and polyfunctional compound to the functionalities of the polyolefin reactive telechelic pre-polymer can be 1.5:2, or in the alternative, the mole ratio of the functionalities on the difunctional and polyfunctional compound to the functionalities of the polyolefin reactive telechelic pre-polymer can be 2:1.5, or in the alternative, the mole ratio of the functionalities on the difunctional and polyfunctional compound to the functionalities of the polyolefin reactive telechelic pre-polymer can be 1:1.05, or in the alternative, the mole ratio of the functionalities on the difunctional and polyfunctional compound to the functionalities of the polyolefin reactive telechelic pre-polymer can be 1:0.95. In a particular embodiment, the mole ratio of the functionalities on the difunctional and polyfunctional compound to the functionalities of the polyolefin reactive telechelic pre-polymer is from 1:0.94 to 1:1.06.

In an alternative embodiment, the disclosure provides a reaction product of the process in accordance with any embodiment disclosed herein, except that the process further comprises addition of a filler to the reaction product. The filler may be a reinforcing or non-reinforcing filler. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, and titanates. In another embodiment, the process further comprises addition of two or more of the foregoing fillers to the reaction product. The addition of one or more fillers may be used to enhance mechanical properties of the reaction product, for example tensile and tear properties, modulus, and heat resistance.

EXAMPLES

The following examples illustrate the present invention but are not intended to limit the scope of the invention.

Chain Transfer Agent (CTA) Synthesis

Tert-butyloxycarbonyl-protected amino chain transfer agent is produced using the method described in *Biochimica et Biophysica Acta (BBA)*; He et al, 1995, vol. 1253, p. 117 and *Macromolecules* Nagarkar, et al 2012, vol. 45, p. 4447; and as shown in Reaction Scheme 1 below:

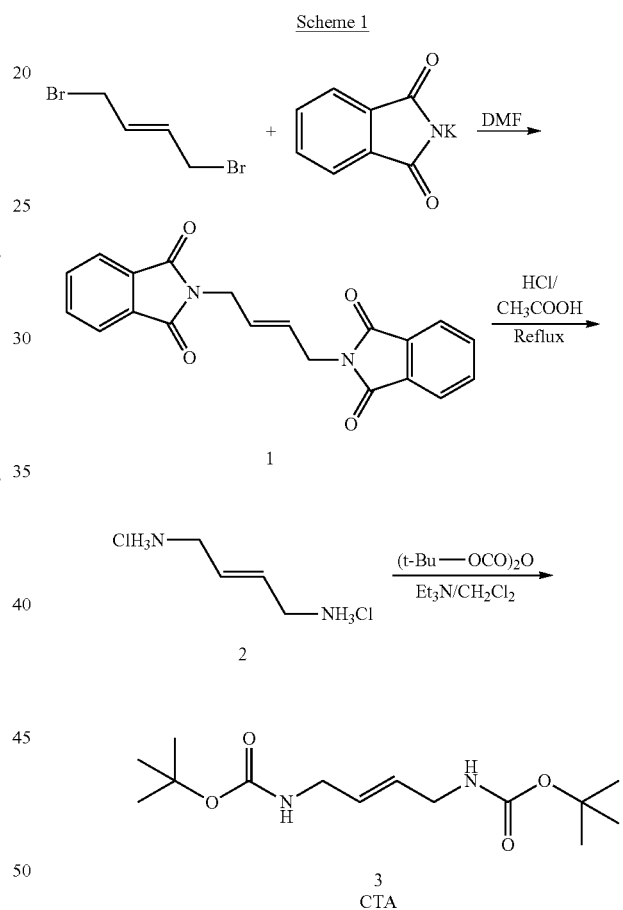

Specifically, the bromines in 1,4-dibromo-2-butene are displaced in a nucleophilic attack by phthalimide to generate compound 1; removal of this group under acidic conditions yields compound 2, the di-hydrochloric salt of the diamino compound. This derivative of the di-amino compound is then protected with a tert-butyloxycarbonyl group to obtain compound 3, di-tert-butyl but-2-ene-1,4-diyl(E)-dicarbamate.

The di-tert-butyl but-2-ene-1,4-diyl(E)-dicarbamate as a chain transfer agent (CTA) is then contacted with 3-ethyl-cyclooctene, as illustrated in Scheme 2 below to produce a dicarbamate telechelic unsaturated polyolefin pre-polymer, P(3ECOE):

Scheme 2

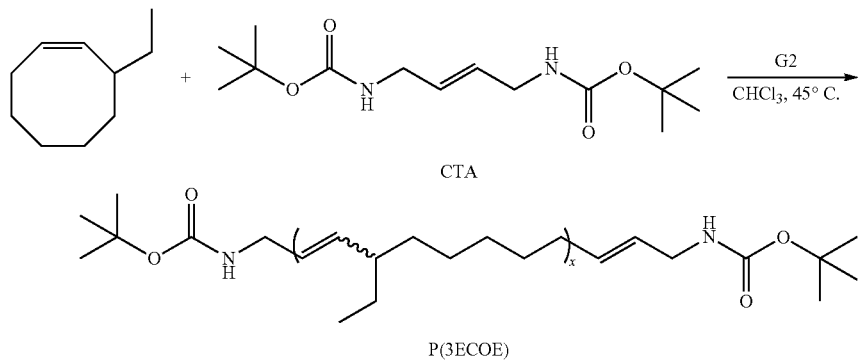

P(3ECOE)

wherein G2 is a second generation Grubbs catalyst, specifically, (1,3-Bis(2,4,6-trimethylphenyl)-2-imidazolidinylidene)dichloro(phenylmethylene)(tricyclohexylphosphine)ruthenium ("(IMesH$_2$)-(Cy$_3$P)RuCl$_2$(CHPh)").

Di-tert-butyl but-2-ene-1,4-diyl-dicarbamate (CTA) was placed in a one-neck 20 ml flask with a Teflon coated magnetic stir-bar. The flask was closed with a rubber septa. Using a needle the flask and its contents were place under high vacuum for 10 minutes and then back-filled with argon; this evacuation-fill cycle was done three times. Anhydrous chloroform and 3-ethyl-cis-cyclooctene were added to the flask via syringe. The system was purged with argon for 20 minutes and then immersed in an oil bath at 40° C. G2 catalyst was added via syringe as a solution in 1 mL of anhydrous-degassed chloroform. After 20 h the solution was quenched with 0.1 mL of ethyl vinyl ether and stirred for an additional 10 minutes. The pre-polymer was isolated by precipitation into room temperature methanol. The solution was stirred for 1 hour and then the methanol was decanted to leave a highly viscous liquid pre-polymer. The pre-polymer was dissolved in 8 ml of CH$_2$Cl$_2$ and then 2 mg of Butylated hydroxytoluene (BHT) were added. The solvent was removed and the pre-polymer dried under high vacuum at 40° C.

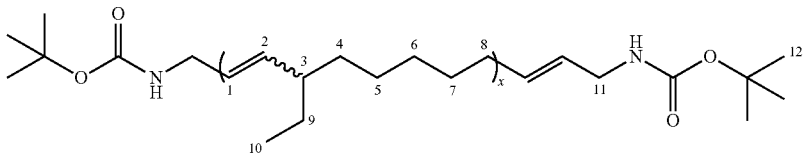

1H NMR (500 MHz, CDCl3): δ=5.32 (m, 1H, =C(1)H), 5.07 (m, 1H, =C(2)H), 4.45 (b, NH), 3.65 (m, C(11)H), 1.98 (m, 2H, —C(8)H2), 1.76 (m, 1H, —C(3)H), 1.45 (s, C(12)H) 1.40-1.07 (m, 10H, —CH2-), 0.83 (t, 3H, —C(10)H3). 13C NMR (125 MHz, CDCl3): δ=134.78 (C2), 130.39 (C1), 44.67 (C3), 35.33 (C4), 32.77 (C8), 29.90 (C6), 29.40 (C5), 28.31 (C9), 27.26 (C7), 11.89 (C10).

The dicarbamate telechelic unsaturated polyolefin pre-polymer, P(3ECOE) was then hydrogenated using p-toluenesulfonyl hydrazide as a hydrogenation catalyst, as shown in Scheme 3 below:

Scheme 3

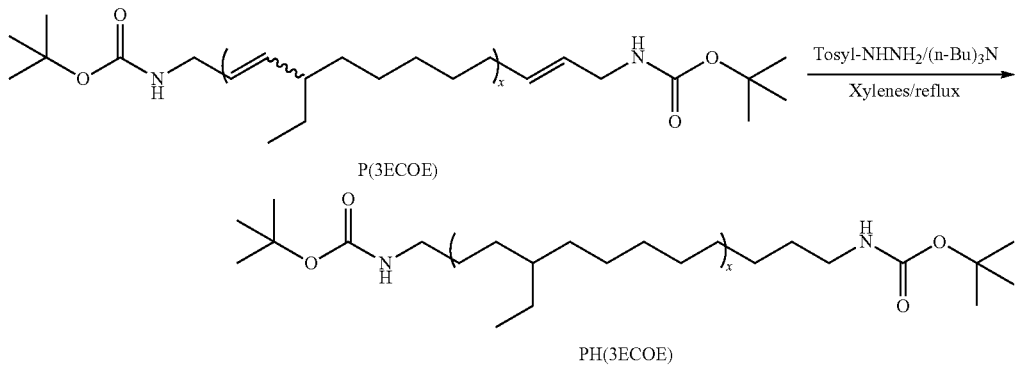

PH(3ECOE)

A mixture of P(3ECOE) (1.5 g, 10 mmol of olefin), p-toluenesulfonhydrazide (3.74 g, 20 mmol), tributylamine (4.75 mL g, 20 mmol), small amount of BHT (ca. 5 mg), and xylenes (80 mL) was refluxed for 9 h, and then allowed to cool to room temperature. The reaction mixture was poured into methanol and the pre-polymer precipitated. The precipitated pre-polymer was isolated by decantation and purified by repeating reprecipitation using the methanol system. The pre-polymer was then dried under high vacuum at 50° C. to afford PH(3ECOE) as a viscous liquid.

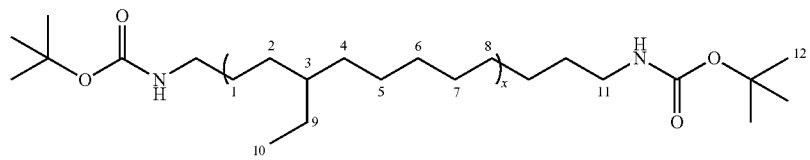

1H NMR (500 MHz, CDCl3): δ=δ 4.5 (b, NH), 3.10 (m, C(11)H), 1.45 (s, C(12)H), 1.43-1.07 (b, 17H, —CH2-, —C(3)H—), 0.85 (t, 3H, —C(10)H3). 13C NMR (125 MHz, CDCl3): δ=38.98 (C3), 33.34 (C2, C4), 30.32 (C6, C8), 29.91 (C7), 26.88 (C1, C5), 26.00 (C9), 10.99 (C10).

Following hydrogenation reaction for 9 hours, 95 mole % conversion to the saturated dicarbamate telechelic polyolefin pre-polymer, PH(3ECOE), was achieved.

Acidic deprotection of the saturated dicarbamate telechelic polyolefin pre-polymer, PH(3ECOE) was conducted resulting in the functional/reactive polyolefin pre-polymer, A-PH(3ECOE), according to Scheme 4 below:

Scheme 4

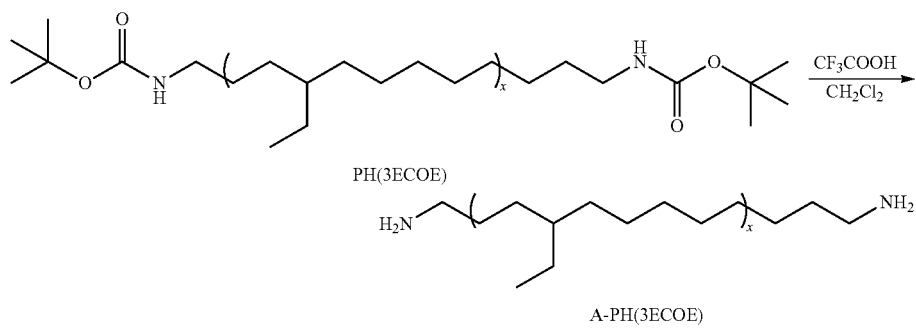

PH(3ECOE) was mixed with dichloromethane (0.5 M) and stirred vigorously at room temperature. Trifluro acetic acid, 5 equivalents per tert-butyloxycarbonyl protecting group, was added in one shot to the solution, and the solution stirred for 5 hours at room temperature. After this time triethyl amine (5 equivalents per boc group, that is 1:1 triethyl amine: trifluoro acetic acid) was added in one shot and the reaction stirred for 5 more minutes. The solution was concentrated under vacuum to ⅓ of the original volume and then precipitated in methanol. The pre-polymer was then dried under high vacuum at 50° C. to afford A-PH(3ECOE) as a viscous liquid.

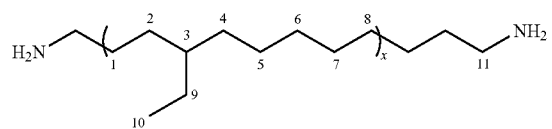

1H NMR (500 MHz, CDCl3): δ=δ 2.73 (m, C(11)H), 1.45 (s, C(12)H), 1.43-1.07 (b, 17H, —CH2-, —C(3)H—), 0.85 (t, 3H, —C(10)H3). 13C NMR (125 MHz, CDCl3): δ=38.98 (C3), 33.34 (C2, C4), 30.32 (C6, C8), 29.91 (C7), 26.88 (C1, C5), 26.00 (C9), 10.99 (C10).

Table 1 provides molecular characteristics and glass transition temperatures of the unsaturated and saturated pre-polymers and the reactive polyolefin.

TABLE 1

| Polymer | $M_n^b$ (kg mol$^{-1}$) | Đ$^c$ | $T_g$ (° C.)$^d$ |
|---|---|---|---|
| P(3EtCOE) | 4.0 | 1.9 | −58 |
| PH(3EtCOE)$^e$ | 4.1 | 2.0 | −68 |
| A-PH(3EtCOE) | 3.9 | 2.0 | −69 |

$^b$Determined by end group analysis using $^1$H NMR spectroscopy assuming exactly two CTA end groups per chain.
$^c$Determined by SEC in THF versus polystyrene standards.
$^d$Determined by DSC (2$^{nd}$ heating cycle) at 10° C. min$^{-1}$.
$^e$95% hydrogenation achieved in 9 h.

Using the reactive polyolefin (A-PH(3ECOE)), three different crosslinking reactions are conducted. In the first, the reactive polyolefin is crosslinked using 1,4-butanediol diglycidyl ether to produce a crosslinked polymer xD-A-PH (3ECOE), as shown in Scheme 5 below:

Scheme 5

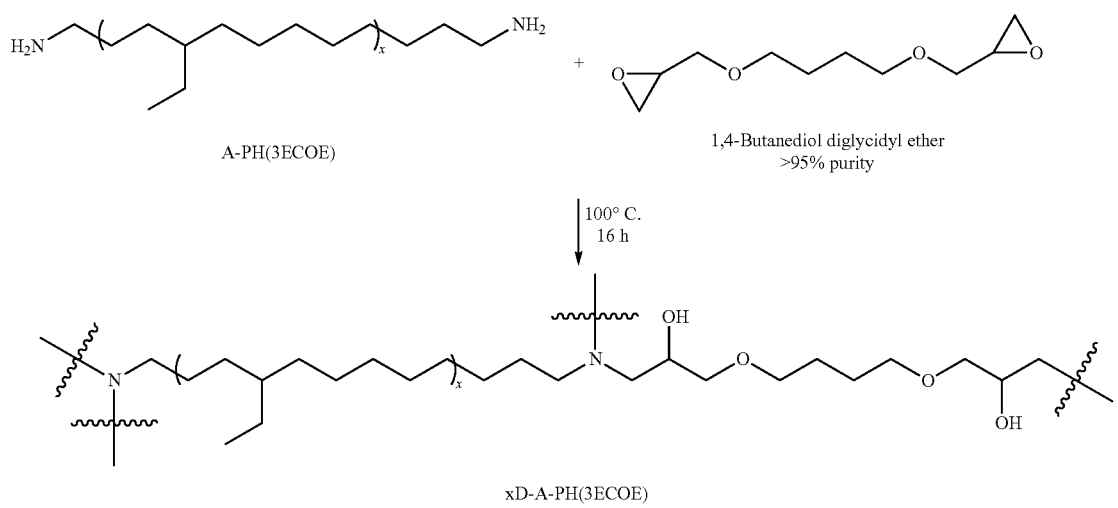

Table 2 provides the molecular characteristics of the cross-linked polymer xD-A-PH(3ECOE).

TABLE 2

| Polymer:Crosslinker | Gel Fraction[c] | $M_n$ solubles (kg mol$^{-1}$)[d] | Đ[d] |
|---|---|---|---|
| 1:2 | 0.70 | 18 | 2.7 |
| 1:2[e] | 0.85 | 16 | 2.7 |
| 1:1.75[e] | 0.73 | 14 | 2.5 |

TABLE 2-continued

| Polymer:Crosslinker | Gel Fraction[c] | $M_n$ solubles (kg mol$^{-1}$)[d] | Đ[d] |
|---|---|---|---|
| 1:1.5[e] | 0.65 | 13 | 2.4 |
| 1:2.5[e] | 0 | 18 | 3.5 |

[c]CH$_2$Cl$_2$ for 72 h replacing the solvent every 24 h. Samples dried at 50° C. under high vacuum until constant weight was obtained.
[d]SEC (dRI, THF, vs polystyrene standards) of the soluble parts obtained after the gel fraction experiment.
[e]Polymer filtrated through silica gel prior crosslinking using hexanes as the solvent.

In second and third crosslinking reactions, trimethylpropane triglycidyl ether and tris(2,3-epoxypropyl) isocyanurate, respectively, are used as a crosslinking agent, as shown in Scheme 6 below:

Scheme 6

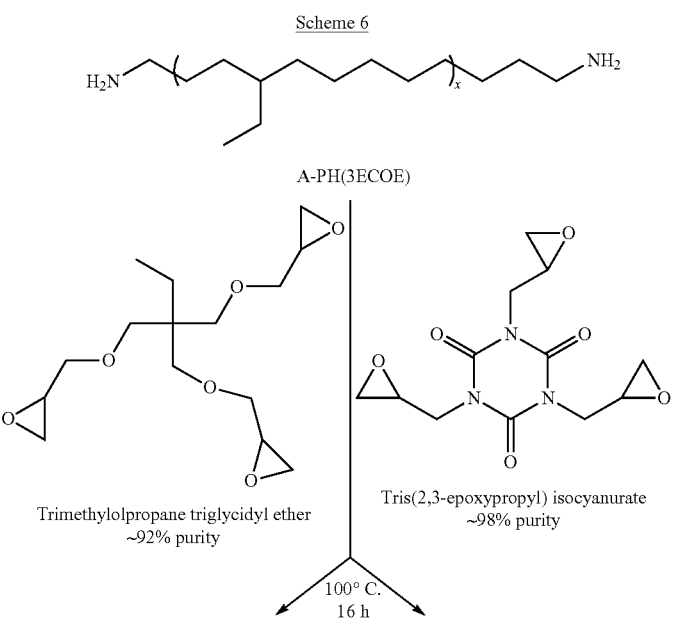

-continued

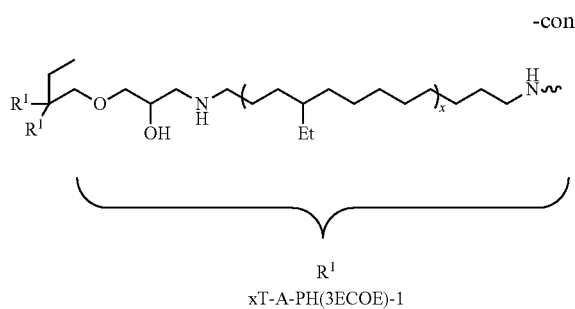

xT-A-PH(3ECOE)-1

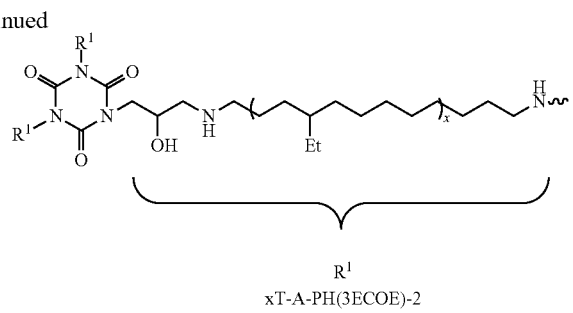

xT-A-PH(3ECOE)-2

Thermal Crosslinking, General Procedure

Crosslinker and the amino-telechelic polyolefin pre-polymer were mixed in a speed mixer (DAC 150.1 FVZ, FlackTek Inc.) at 1800 rpm in 20 segments of 45 seconds each. The mixture was then slowly transferred into a Teflon mold. The mold was then place in an oven preheated at 100° C. and the material cured for 16 hours. A light-yellow, transparent thermoset elastomer was obtained. The tri-functional crosslinkers were mixed in a 3:2 polymer to crosslinker mol ratio. In the example using tris(2,3-epoxypropyl) isocyanurate, the crosslinker was dissolved in the minimum amount of $CH_2Cl_2$ prior to mixing with the polymer in the speed mixer. The mixture was then put under high vacuum for 72 h at room temperature until all solvent was removed. After this time the general crosslinking procedure was applied.

Figure 2:
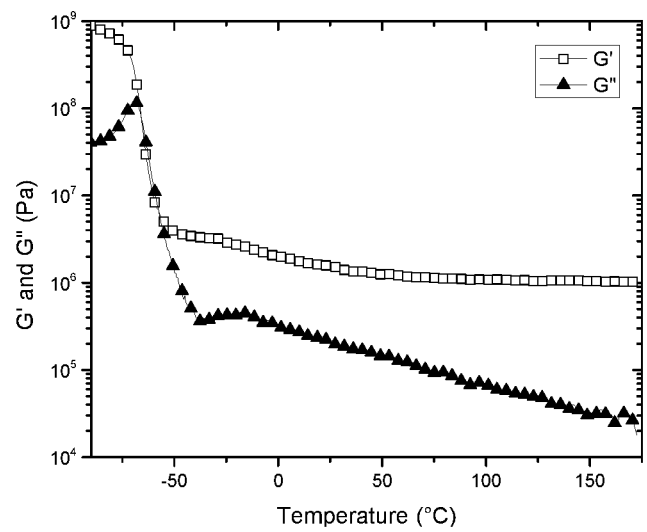
FIG. 2 is a graph illustrating the dynamic mechanical thermal analysis of crosslinked polymer, XT-A-PH (3ECOE)-2, Torsion test from −90 to 200° C. at 5° C. min$^{-1}$. ω=6.28 rad s$^{-1}$ and γ=0.05%.

The trimethylpropane triglycidyl ether is commercially available from Sigma-Aldrich as a reagent grade having a purity of 92% as measured by 1H NMR. The tris(2,3-epoxypropyl) isocyanurate is commercially available from Sigma-Aldrich having a purity of 98%. The tris(2,3-epoxypropyl) isocyanurate is dissolved in dichloromethane prior to use in the crosslinking reaction. FIG. 1 provides the stress strain testing curves of the crosslinked polymer, XT-A-PH (3ECOE)-2. FIG. 2 illustrates the dynamic mechanical thermal analysis of the crosslinked polymer, XT-A-PH (3ECOE)-2.

Test Methods

Test methods include the following:
Number-average molecular weight ($M_n$) was determined by $^1H$ NMR end group analysis.
Dispersity (Đ) was determined at 25° C. (based on a 10-point calibration curve using polystyrene standards) using a Size Exclusion Chromatography (SEC) instrument with THF as the mobile phase at a flow of 1 mL/min. The SEC instrument used is equipped with a RI Wyatt Optilab T-rEX detector. Size exclusion was performed with one Waters Styragel guard column and three successive Waters Styragel columns (HR6, HR4 and HR1), packed with rigid 5 μm styrene divinylbenzene particles. Together these columns provide effective separation of samples in the molecular weight range of 100-10,000,000 g $mol^{-1}$.
Differential Scanning calorimetry (DSC) was performed on a TA Instruments Discovery DSC calibrated with an indium standard. Samples with a minimum mass of 4 mg were prepared in hermetically sealed aluminum pans and analyzed under $N_2$ with a heating rate of 10° C./min. Thermal transition temperatures were determined from the second heating to erase thermal history.
Dynamic Mechanical Temperature Analysis (DMTA) were performed in an 8 mm or 25 mm parallel plate geometry using an ARES-G2 rheometer (TA Instruments) (ω=6.28 rad/s, γ=0.05%). During the experiment temperature was increased at a rate of 5° C./min.
Tensile strain tests of the cured elastomer was conducted on a Shimadzu AGS-X Instrument. Tensile properties of ASTM D1708 microtensile bars were tested at strain rate of 127 mm/min; all values are reported as the average and standard deviation of at least four samples.

The present invention may be embodied in other forms without departing from the spirit and the essential attributes thereof, and, accordingly, reference should be made to the appended claims, rather than to the foregoing specification, as indicating the scope of the invention.

What is claimed is:

1. A process for producing a crosslinked polymer comprising contacting a diamino telechelic saturated polyolefin pre-polymer with one or more polyfunctional compounds which is reactive with the diamino telechelic saturated polyolefin pre-polymer, optionally in the absence of a catalyst, to form a crosslinked, and optionally chain-extended, polymer,
    wherein the one or more polyfunctional compounds are selected from the group of polyisocyanates, polycarboxylic acids, polyacyl chlorides and difunctional epoxides, and
    wherein the diamino telechelic saturated polyolefin pre-polymer is produced by a process comprising:
    reacting alkyl-cis-cyclooctene, and optionally cis-cyclooctene, in the presence of a multifunctional chain transfer agent possessing two or more amino groups wherein the two or more amino groups are protected by one or more protecting groups under ring opening metathesis polymerization conditions to form a dicarbamate telechelic unsaturated polyolefin pre-polymer;
    partially hydrogenating the dicarbamate telechelic unsaturated polyolefin pre-polymer to produce a saturated polyolefin dicarbamate telechelic pre-polymer; and
    removing the one or more protecting groups from the saturated polyolefin dicarbamate telechelic pre-polymer.

2. The process according to claim 1, wherein the alkyl-cis-cyclooctene is 3-hexyl-cis-cyclooctene.

3. The process according to claim 1, wherein the chain transfer agent is di-tert-butyl but-2-ene-1,4-diyl(E)-dicarbamate.

4. The process according to claim 1, wherein the removing the one or more protecting groups is achieved by contacting the dicarbamate telechelic polyolefin pre-polymer with an acid.

5. The crosslinked polymer produced by the process of claim 1.

* * * * *